United States Patent [19]

Silvey

[11] Patent Number: 4,839,108
[45] Date of Patent: Jun. 13, 1989

[54] LIQUID DISTRIBUTION DEVICE AND PAN

[75] Inventor: Frank C. Silvey, Plainsboro, N.J.

[73] Assignee: Mobil Oil Corp., New York, N.Y.

[21] Appl. No.: 136,081

[22] Filed: Dec. 21, 1987

[51] Int. Cl.⁴ .................................................. B01F 3/04
[52] U.S. Cl. ......................................... 261/97; 261/98;
261/110; 261/111; 261/113; 196/100; 196/135;
196/139; 202/158; 208/146; 422/220
[58] Field of Search ................... 261/97, 98, 110, 111,
261/113; 202/158, 159; 422/195, 193, 220;
196/100, 135, 139; 208/146

[56] References Cited

U.S. PATENT DOCUMENTS

| 1,987,904 | 1/1935 | Houdry . | |
|---|---|---|---|
| 2,094,601 | 10/1937 | Houdry . | |
| 3,112,256 | 11/1963 | Young et al. | 208/213 |
| 3,146,189 | 8/1964 | Kunreuther et al. | 208/146 |
| 3,259,380 | 7/1966 | Brown | 261/97 |
| 3,378,349 | 4/1968 | Shirk . | |
| 3,392,966 | 7/1968 | Eckert | 261/97 |
| 3,392,967 | 7/1968 | Eckert | 261/98 |
| 3,419,251 | 12/1968 | Eckert | 261/98 |
| 3,466,151 | 9/1969 | Sicard et al. . | |
| 3,524,731 | 8/1970 | Effron et al. . | |
| 3,591,345 | 7/1971 | Hochman et al. . | |
| 3,915,847 | 10/1975 | Hutchings | 208/146 |
| 4,126,539 | 11/1978 | Derr, Jr. et al. | 208/108 |
| 4,126,540 | 11/1978 | Grosboll et al. | 208/146 |
| 4,182,741 | 1/1980 | Carson et al. | 422/211 |
| 4,557,877 | 12/1985 | Hofstetter | 261/97 |
| 4,689,183 | 8/1987 | Helms | 261/97 |
| 4,752,307 | 6/1988 | Asmus | 261/97 |

FOREIGN PATENT DOCUMENTS

| 573176 | 9/1977 | U.S.S.R. | 261/97 |
|---|---|---|---|
| 762985 | 12/1956 | United Kingdom . | |

Primary Examiner—Wilbur Bascomb
Attorney, Agent, or Firm—Alexander J. McKillop; Charles J. Speciale; Dennis P. Santini

[57] ABSTRACT

A liquid distribution device for more uniformly distributing a liquid to packed beds is composed of a box-pipe distributor, for the delivery of liquid to a pan distributor having a deck and risers postioned on the deck, with ells contained in the risers. The ells direct liquid axially through the risers so that gas/liquid interaction is minimized. The pan distributor also includes a plurality of holes positioned about the risers and a set of wall-ells about the periphery of the pan for more completely and uniformly distributing a liquid to packed beds positioned beneath the liquid distribution device.

14 Claims, 4 Drawing Sheets

FIG. 9

LIQUID DISTRIBUTION DEVICE AND PAN

FIELD OF THE INVENTION

The present invention relates to a distribution device for more uniformly distributing a liquid feed entering a vertical structure to one or more packed beds stacked within the structure.

BACKGROUND OF THE INVENTION

In hydrocarbon processing such as in the alkylation of gaseous isoparaffinic compounds, effluent streams containing valuable by-products may be produced. For instance, in the alkylation of isobutane with propylene/butylene mixtures, an effluent stream may be produced which contains propane and n-butane. The separation and recovery of propane for use as a fuel, and the recovery of butane as a gasoline blending agent is particularly desirable. Frequently, separation is accomplished by passing a mixture of the components over packed inert material beds in a heated distillation tower. The packed material may, for example, be inert metal elements, ceramic elements, etc. A liquid component, the higher boiling point material, is recovered at the bottom of the tower and a gaseous product is recovered at the top. In certain other hydrocarbon processes, it is desirable to remove impurities from a feed. For instance, the removal of impurities such as $CO_2$, $H_2S$ etc. from natural gas vapor streams is desirable. Separation of these impurities may be accomplished by passing a stream over packed absorption material beds so that the impurity is absorbed from the feed.

However, efficient separation of components of a liquid feed, or the separation of impurities from a vapor feed stream, depends on uniformly distributing the feed to the material beds of a tower.

Known devices exist for the distribution of feed to material beds within towers. For instance, U.S. Pat. No. 4,182,741 relates to a device which distributes a fluid to a bed of catalyst particles. The device comprises a fluid inlet conduit, the length thereof being slightly smaller than the diameter of the reactor. The device includes a plurality of fluid distribution conduits consisting of an outer pipe and a smaller inner pipe that lie in a common plane, perpendicular to the fluid inlet conduit.

U.S. Pat. No. 3,112,256 discloses a distribution device for distributing a vapor-liquid mixture phase feed to a contacting zone in a reactor. The device includes an upper distribution tray for receiving a liquid portion of a feed and for evenly distributing the feed, without impeding gas flow. The device also includes one or more foraminous baskets immersed in the upper surface of the active particles which form solid catalyst beds below the distribution tray.

Other patents which disclose distribution systems which may be of interest include U.S. Pat. Nos. 3,915,847; 3,524,731; 3,146,189; and 2,094,601.

SUMMARY OF THE INVENTION

An object of this invention is the construction of a device which ensures that a liquid feed entering a tower is properly, and more uniformly, distributed to one or more packed material beds. More particularly, the invention relates to a liquid distribution device for more uniformly distributing a liquid to packed material beds. The device is composed of a main conduit, for the delivery of liquid to a pan distributor having a deck and risers positioned on the deck, with ells contained in the risers. The ells direct liquid axially through the risers so that gas/liquid interaction is minimized. The pan distributor also includes a plurality of holes positioned about the risers and a wall about the periphery of the deck having wall-ells for directing liquid to the periphery of the packed material beds below.

DETAILED DESCRIPTION OF THE INVENTION

Figure 1:
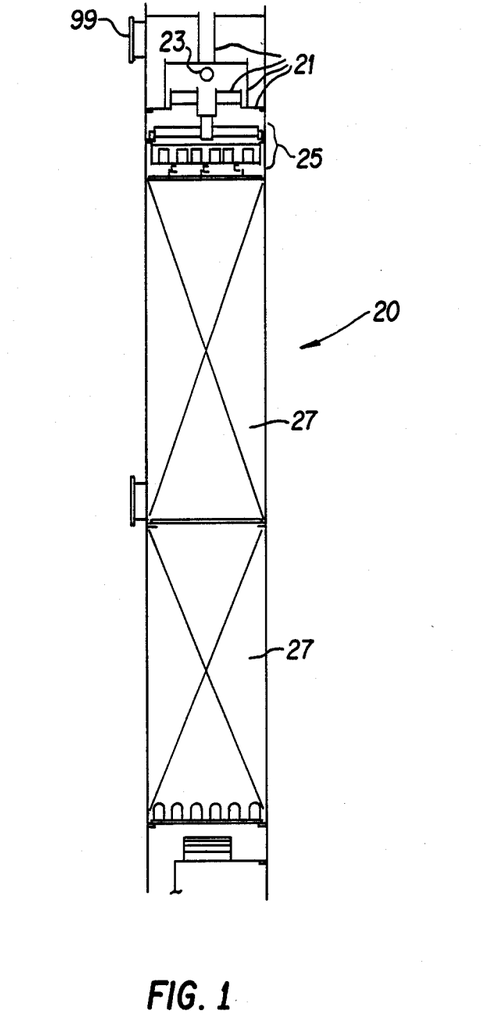
FIG. 1 is a side sectional view of a portion of a hydrocarbon processing tower which may be a $C_3/C_4$ hydrocarbon splitter housing the distribution device of the claimed invention.

FIG. 1 shows a side sectional view of a vertical section of a hydrocarbon processing tower 20. Tower 20 may be a $C_3/C_4$ splitter for separating propane and butane from mixtures thereof, or it may be a tower used for separating other hydrocarbon mixtures. The tower may also be an absorbing tower for removing $H_2S$ and $CO_2$ from a natural gas vapor stream.

As illustrated in FIG. 1, tower 20 has a small internal diameter, typically about 1,566 millimeters (mm). Tower 20 houses sequential devices for accepting and passing a liquid feed and an internal reflux liquid from an upper tower section to a lower tower section. A series of trays (not shown) are provided above the uppermost portion of tower 20. These trays deliver internal reflux liquid to transition devices 21. Transition devices 21 in turn deliver the internal reflux liquid to a distribution device 25, while a feed pipe 23, located in the vicinity of the transition devices, delivers a liquid feed to distribution device 25. In this manner, distribution device 25 receives liquid from two separate sources. Distribution device 25 is the instant invention. The distribution device 25 then uniformly distributes the liquid feed and the internal reflux liquid to packed material beds 27 which perform a separation or absorption function.

Figure 2:
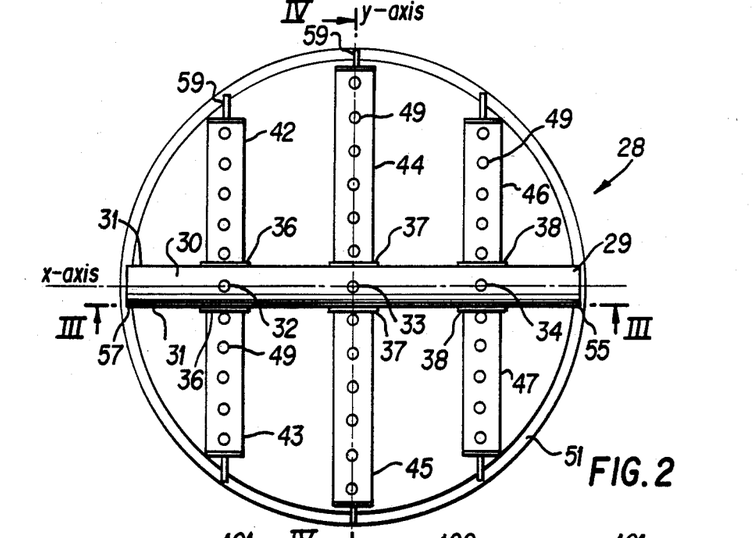
FIG. 2 is a plan view showing a box-pipe distributor of the invention, partly in section, and illustrating bottom distribution holes thereof.
Figure 4:
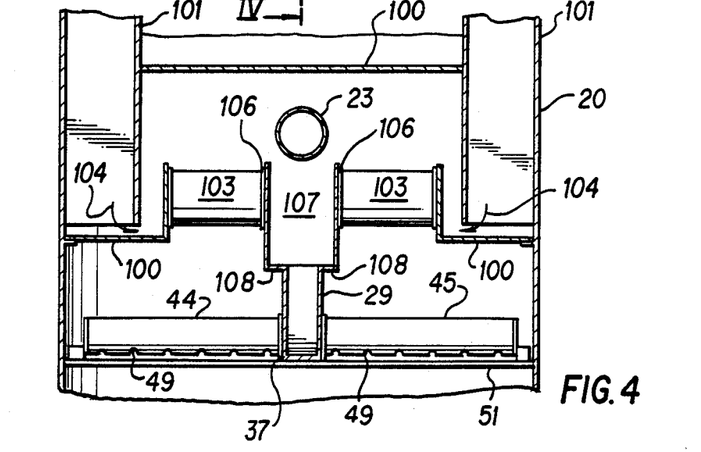
FIG. 4 is a cross section of the box-pipe distributor of FIG. 2 taken along the Y-axis in the direction of the arrows of FIG. 2, and showing transition devices absent from FIG. 2.

A first embodiment of the distribution device 25 of the invention is shown in FIGS. 2 and 4. The distribution device 25 includes two components, a box-pipe distributor 28 having a main conduit 29, more clearly seen in FIGS. 2 and 4, and a pan distributor 62 more clearly seen in FIGS. 5 and 6.

Figure 3:
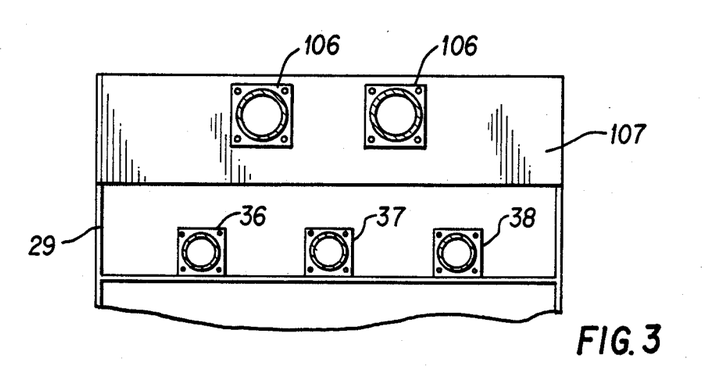
FIG. 3 is a side sectional view taken along line III—III of a portion of the distribution device showing flanges which connect branch conduits to a conduit of the box-pipe distributor of FIG. 2 and flanges which connect collector tubes to an open-transition box.

The box-pipe distributor 28 will be described first with reference to FIGS. 2 and 4. Box-pipe distributor 28 includes a substantially straight elongated main conduit 29 having a bottom wall 30 and side walls 31 extending upwardly therefrom. Main conduit 29 lies along a diameter of the tower and is slightly smaller in length than the diameter of the tower so that it can be positioned horizontally within the tower along the tower diameter. Bottom wall 30 of main conduit 29 has three circular holes, 32, 33, and 34, each being twenty-eight millimeters in diameter, positioned on or near the longitudinal center of bottom wall 30. Hole 33 is a point on or near the vertical axis of the tower. Holes 32 and 34 are positioned on either side of hole 33 and are spaced an equal distance therefrom. The distance separating holes 32 and 34 from hole 33 is about twenty-three percent of the length of main conduit 29. Main conduit 29 has side walls 31 separated by about 130 millimeters. Three sets of paired flanges, 36, 37 and 38, as seen in FIGS. 2 and 3, are positioned on the outside faces of side walls 31. Holes 32 to 34 lie midway between the paired flanges.

Box-pipe distributor 28 also includes branch conduits 42 to 47 which have a first end connected to the paired flanges of the main conduit 29 and a second closed end. Branch conduits 42 to 47 are substantially perpendicular to the box-pipe distributor and the box-pipe distributor and the branch conduits lie in a plane substantially horizontal to the vertical axis of the tower. As shown, branch conduits 42 and 43 are connected to flanges 36; branch conduits 44 and 45 are connected to flanges 37 and branch conduits 46 and 47 are connected to flanges 38. The branch conduit connected to one member of a pair of flanges is substantially equivalent in length to the branch conduit connected to the other member of the pair. The branch conduits 42 to 47, as shown, extend from the side walls 31 of main conduit 29 to a short distance from the inner wall of the tower. Each branch conduit has a plurality of spaced circular bottom holes 49 therealong which are about thirty millimeters in diameter. There are a total of thirty-two bottom holes on the branch conduits, the longer conduits having more holes than the shorter conduits, as shown. The ends of the branch conduits connected to the flanges are in open communication with main conduit 29 and the opposing ends, side walls, and top walls of the branch conduits are closed. The branch conduits 42 to 47 are preferably round in cross section, although other cross-sectional shapes can be used.

The box-pipe distributor 28, including main conduit 29 and the branch conduits 42 to 47, is supported within tower 20 by a peripheral support, such as a conventional tray ring 51, as shown in FIGS. 2 and 3. Ring 51 is fastened, for example, by welding the ring at 53 (FIG. 6) to the inside of tower 20. Edges 55 and 57 of main conduit 29 rest on the upper surface of tray ring 51 and the closed end walls of the branch conduits 42 to 47 are fastened preferably by being bolted to brackets 59, but the branch conduit can be welded or clamped thereto. Brackets 59, in turn, are preferably bolted to the upper surface of tray ring 51, but may be welded or clamped.

Figure 5:
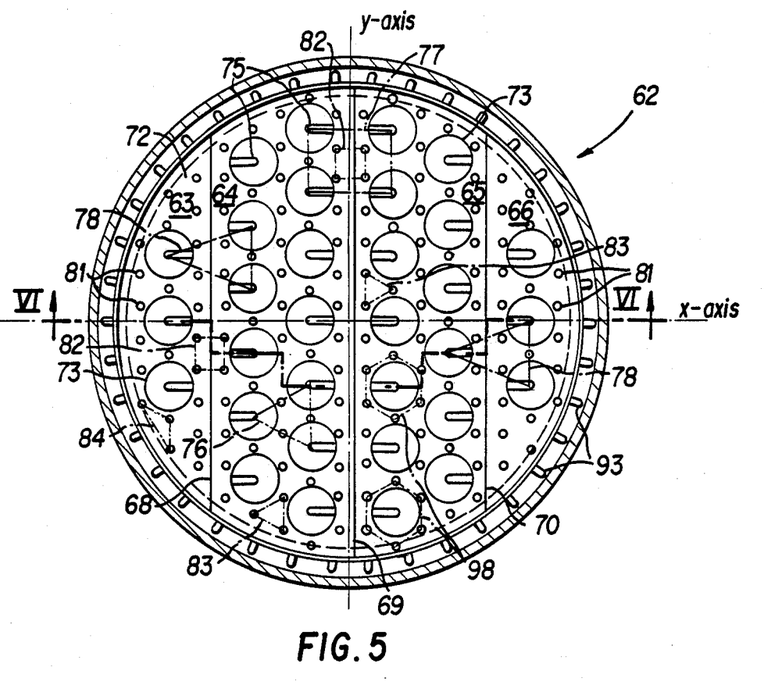
FIG. 5 is a plan view of a pan distributor of the claimed invention.
Figure 6:
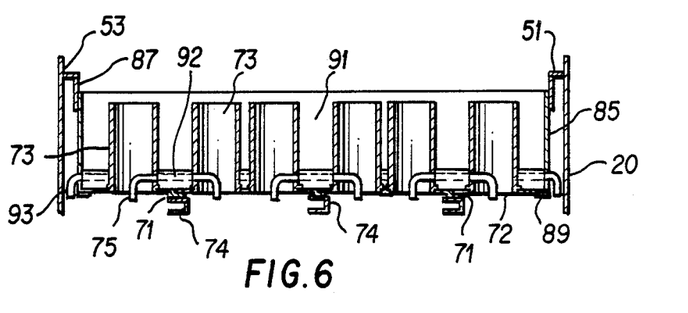
FIG. 6 is a side view, partly in section, of the device of FIG. 5 taken along line VI—VI.

Positioned below tray ring 51 is a pan distributor 62 (FIGS. 5, 6). The bottom portion of pan distributor 62 is composed of a plurality of flat panels 63 to 66 aligned sequentially in generally the same plane and fastened together at their inner edges by welds which define seams 68, 69 and 70, shown by black solid lines in FIG. 5. The panels have overlapping edges as more clearly shown in FIG. 6 at 71; trusses 74 reinforce the seams created. The panels with welded seams create a pan deck 72 which has an outer diameter of 1,436 millimeters. The panels are of dimensions which conform to the interior dimensions of the tower. Each panel (63 to 66) has at least one row of risers 73 and every riser row is parallel to the Y-axis of the pan deck 72 and, hence, to one another. The entire pan deck 72 supports thirty-two risers. Risers 73 are hollow cylindrically-shaped tubes having an outer diameter of 152 millimeters and a height of a little over 270 millimeters. Each riser has open bottom and top ends. The bottom end of each riser may extend slightly below pan deck 72 and the top thereof extends 270 millimeters above the pan deck 72. In assembling risers 73 to pan deck 72, the risers are first crimped near their bottom and the portion of the riser below the crimp is inserted into a hole of one of the panels (63 to 66). The riser bottom is then swaged and seal welded to the panel. Although the risers, as shown, extend below deck 72, they may be flush with the bottom surface thereof. Some of the risers about the periphery of the pan could possibly interfere with the ring 89 supporting the deck. If this happens, bottom portions of the risers may be cut to accommodate the ring.

Each riser 73 has a 90° elbow tube or ell 75 of one-half inch (127 millimeters) (inner) diameter pipe. The ells are substantially housed and supported by a bottom portion of the risers. For instance, a horizontal extension of each ell 75 terminates at a riser sidewall, above the crimp in the riser, about thirty-eight millimeters above the deck, and a vertical extension of each ell extends downwardly in a direction of the aixs of each riser 73 and projects below the riser and pan deck 72. It is critical that the vertical extension projects below the pan deck 72 so that the opening of the vertical extension is positioned away from the riser bottom where vapor velocity is much lower relative to the velocity of vapor within the riser. The horizontal extension of each ell terminating at a riser sidewall, above the deck and crimp, opens and faces toward a seam created by welding panels 63 to 66 together. Panels 63 and 66 contain a single row of risers and are mirror images of one another. The openings of the ells of these risers face toward the Y-axis of the pan deck 72 (FIG. 2) and face seams 68 and 70, respectively, which are parallel to the riser rows and the Y-axis of deck 72. Panels 64 and 65 have two rows of risers and are mirror images of one another. A first row of risers 73 of each panel 64 and 65 has ells 75 with above-pan deck openings that face away from the Y-axis of the pan and toward seams 68 and 70, respectively. The second row of risers of panels 64 and 65 has ells with openings that face toward the Y-axis of the pan deck 72 and toward seam 69. Adjacent risers positioned within a single panel are set in a triangular pitch (preferably an equilateral triangular pitch) relative to one another as shown by equilateral triangle 76. Adjacent risers located on a panel, lying next to weld seam 69, are set in a rectangular pitch (preferably a square pitch) relative to adjacent risers lying across weld seam 69 on a second panel as shown by square 77. Risers of a first panel next to seams 68 or 70 are set in a triangular pitch (preferably an equilateral triangular pitch) relative to the risers on a second panel across seams 68 or 70, as shown by triangles 78.

The pan deck 72 includes a plurality of rows of circular holes 81, having diameters of 7/16 inch (111 millimeters), drilled through its surface. Rows of holes 81 are parallel to each other and to the Y-axis of the pan deck. As seen in FIG. 5, every panel has 2(R)+1 rows of holes 81, where R is equal to the number of rows of risers in a panel. Sixteen rows of holes 81 exist in the pan deck 72. Every panel (63 to 66) has at least one row of holes adjacent a weld seam of the panels. Adjacent holes of a panel, lying next to a weld seam, are set in a rectangular pitch (preferably a square pitch) relative to adjacent holes on an adjacent panel lying across from the seam of the first panel. This relationship is shown by squares 82. However, adjacent holes within a single panel lie in a triangular pitch (preferably an equilateral triangular pitch) relative to one another, as shown by equilateral triangles 83. In some instances, most notably about the periphery of the pan deck, some of the holes 81 are not set in an equilateral pitch relative to other holes as seen by triangle 84. The equilateral relationship is ideal but is departed from where necessary. Holes 81 are positioned in a hexagonal pattern, having angles of 120°, about the risers, as shown by hexagons 98 in FIG. 5.

Pan distributor 62 has a wall 85, the outer diameter of which is substantially equal to the outer diameter of the pan deck 72. The bottom of the wall is welded to the outer edge of the pan deck 72 defined by the outer edges of the welded panels. Wall 85 extends above the height of risers 73 and is hung from the bottom of tray ring 51 by brackets 87. The peripheral bottom circumference of pan deck 72 is supported by ring 89. The wall 85 and panels 63 to 66 create a liquid holding area 91 (FIG. 6) defined by pan deck 71 and wall 85. A liquid 92 collects in holding area 91.

The outer periphery of wall 85 also has thirty-eight wall-ells 93 which are generally equally spaced about the circumference of wall 85. Wall-ells 93 have a horizontal extension welded to the outer face of wall 85 and open into liquid holding area 91. These openings are set at a height substantially level with or equal to the height of the openings of ells 75. A vertical extension of each of wall-ell 93 is parallel to the axis of tower 20 and lies between the inside wall of tower 20 and the outside surface of wall 85. The openings of the vertical extension may extend below pan deck 72.

The above-described distribution device 25, including box-pipe distributor 28 and pan distributor 62, may form part of a new tower 20, or it may be a retrofit to an existing tower. To retrofit an existing tower, parts are assembled within the tower after being carried into the tower through man-way 99 (FIG. 1).

Although not practical, the pan deck 72 may be composed of a single round panel, instead of welded panels 62 to 66. Such a deck would be assembled as part of a new toner and would naturally not have seams 68 to 70.

As shown in FIG. 6, a greater horizontal distance exists between risers opposing one another across a panel than exists between risers of a single panel having two riser rows. The square and triangular pitch of the risers confirms this observation. The risers across a panel from one another have a riser-center-to-riser-center spacing of about 258 millimeters apart, while risers across adjacent rows from one another in a single panel have a center-to-center spacing of about 172 millimeters. For purposes of this invention, about half of the distance of the greater spacing defined above constitutes a "seam," whether such a seam is physically present or not.

As shown in FIG. 2, main conduit 29 of box-pipe distributor 28 forms an X-axis and branch conduits 44 and 45 form the Y-axis of the box-pipe distributor 28. The box-pipe distributor 28 is superposed above the pan distributor 62 on tray ring 51 so that branch conduits 42 and 43, with bottom holes 49, are directly above, and extend along, weld seam 68. Branch conduits 42 and 43 are horizontally displaced above risers 73. Branch conduits 44 and 45 are directly above, and extend along, weld seam 69, and are horizontally displaced above risers 73. Branch conduits 46 and 47 are directly above, and extend along, weld seam 70, and are horizontally displaced above risers 73. The branch conduit pairs, and seams positioned below, each define points of a vertical plane substantially perpendicular to the horizontal plane defined by branch conduits 42 to 47 and the main conduit 29. Holes 32, 33 and 34 of the main conduit 29 are directly above the X-axis of pan deck 72 of pan distributor 62.

In a tower 20 designed to separate components of a liquid feed, for example a $C_3/C_4$ splitter, internal reflux liquid will flow from overhead trays (not shown) to the transition devices 21. As shown in FIG. 4, the transition devices 21 are composed of trays 100, downcomers 101, two pairs of collector tubes 103, and an open-transition box conduit 107 (FIG. 4). From trays located above the structure shown, internal reflux liquid collects in downcomers 101. The internal reflux liquid will travel the path of arrows 104 shown in FIG. 4. Two pairs of collector tubes 103 are connected by flanges 106 to the sides of open-transition box conduit 107 having a "U-shaped" cross-section. Collector tubes 103 convey internal reflux liquid to open-transition box conduit 107. Open-transition box conduit 107 has a width slightly greater than that of main conduit 29 of distributor 28, as seen in FIG. 4. Open-transition box 107 is connected to the top of main conduit 29 at lips 108. The remainder of the bottom of open-transition box 107 is open and delivers feed and an internal reflux to main conduit 29 of distributor 28. Each of bottom holes 32 to 34 and 49 discharges liquid along seams 68, 69 and 70 of pan distributor 62, which is supported below distributor 28 by tray ring 51 as described above.

In a $C_3/C_4$ splitter, gas comprising $C_3$ vapor components will be collected at the top of the tower (not shown) and a $C_4$ liquid component will be collected at the bottom. To maintain the working capacity of the tower, a feed mixture of $C_3/C_4$ components is added through feed pipe 23 (FIGS. 1, 4). Feed pipe 23 is perpendicular to the vertical axis of the tower and it is located above and parallel to open-transition box conduit 107 and main conduit 29. Feed pipe 23 has bottom holes (not shown) along its bottom length for delivery of feed to the open top of open-transition box conduit 107, which then delivers the feed to main conduit 29.

The internal reflux liquid/feed liquid (hereinafter, liquid) is then distributed to branch conduits 42 to 47 and discharged to seams on the second distributor or pan distributor 62 through bottom holes 32 to 34 and 49. However, bottom holes 32 to 34 are smaller in diameter than holes 49 because the head in the main conduit 29 is larger than the head in branch conduits 42 to 47.

On delivery of liquid to the seams, the liquid will spread over the pan deck 72 quickly reaching a liquid level 92 above the horizontal openings of the ells, and liquid level 92 is maintained throughout any separation process using distribution device 25. The minimum flow rate of liquid is contingent on maintaining the liquid level 92 above the horizontal extension of ells 75 and wall-ells 93. Normally, such a liquid will spread over a pan deck, creating waves and swells causing an uneven distribution of liquid to packed material beds below. The box-pipe distributor with its branches and main conduit eliminate waves and swells as liquid is more uniformly distributed to pan deck 72. Holes 81 of pan deck 72 also provide a more uniform distribution of liquid to packed material beds 27 below pan distributor 62. And as the liquid level increases in the liquid holding area 91, ells 75 and wall-ells 93 discharge liquid to the packed material beds. It is believed that wall-ells 93 increase the efficiency of the distribution of liquid by about fifty percent.

As the liquid is conveyed downwardly over the packed material beds, which provide a contact area for the separation of gases from the liquid, the gases rise. The gases on exiting from the packed material beds pass through risers 73 which house and support ells 75. The positioning of ells 75 within risers 73 and the below-deck vertical extension of ells 75 not only ensures additional liquid flow through the deck, but also prevents entraining of liquid in the rising vapor. Gas passing through the risers will proceed upwardly between the maze of conduits of distribution device 25 to the top of tower 20 for collection. Gas not collected is condensed and falls back down through the tower as internal reflux liquid.

Figure 7:
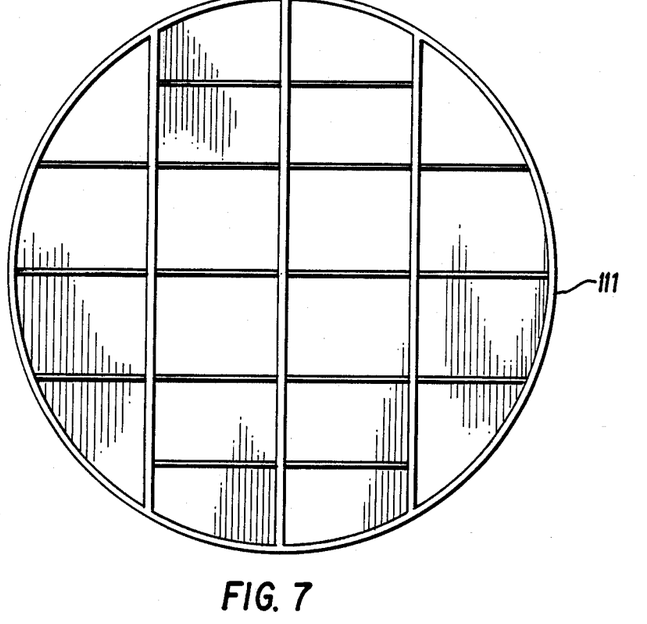
FIG. 7 is a plan view of the hold down grating used with the invention.
Figure 8:
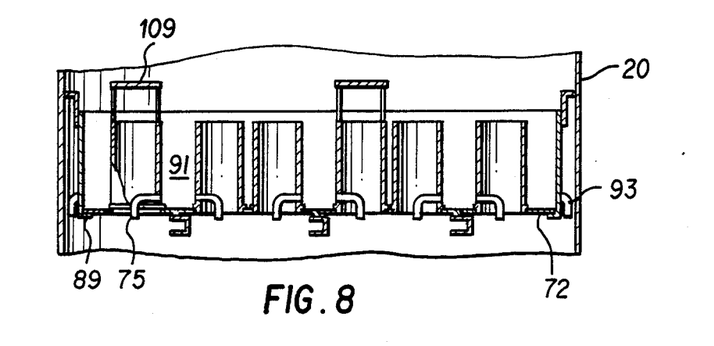
FIG. 8 is a side sectional view of a second embodiment of the invention showing a modification of the pan distributor of FIG. 6.

Although not shown, a pan distributor 62 may be positioned between packed material beds to ensure a more uniform flow of liquid from an upper packed bed to a lower packed bed. In such a case, risers 73 are modified to include a thin, flat hat 109 (FIG. 8) to prevent the passage of liquid therethrough. The diameter of the hat is equal to the outer diameter of an associated riser 73. Wherever a pan distributor 62 is located, a hold-down grating 111 (FIG. 7) is positioned between the packed material beds 27 and the distributor 62 to maintain the packing in place when the packed material beds are bumped.

Figure 9:
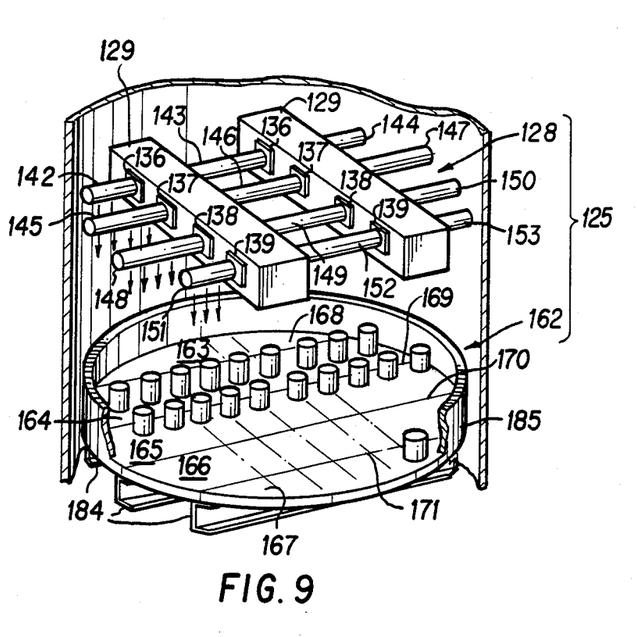
FIG. 9 is a perspective view showing another embodiment of the invention which may be used in larger diameter towers.

When the invention is used with a larger diameter tower, the distributor device can be modified as shown in FIG. 9. The distribution device 125 still has a box-pipe distributor 128 and a pan distributor 162. However, box-pipe distributor 128 has two parallel main conduits 129 positioned on opposite sides of a midline diameter of the tower. The two main conduits 129 reside in a horizontal plane relative to the vertical axis of the tower. Each main conduit 129 is an elongated conduit having a bottom and sidewalls extending upwardly therefrom. The bottom wall has four bottom holes (not shown) positioned along its longitudinal midline. Each main conduit 129 also has four paired flanges (136, 137, 138, 139) on opposing side walls and each flange has connected thereto at least one branch conduit. Box-pipe distributor 128 has twelve branch conduits 142 to 153; four of the branch conduits, 143, 146, 149 and 152, bridge the box conduits 128, as shown in FIG. 9. The remaining branch conduits lie on either side of the bridging branch conduits.

The pan distributor 162 of this embodiment has five flat panels 163, 164, 165, 166 and 167 lying in substantially the same plane and sequentially aligned edge to edge with slightly overlapping edges that are connected by welded seams 168, 169, 170 and 171. Four trusses 184 (one being omitted from view) are shown supporting the seams 168–171. For clarity of FIG. 9, the pan rings and transition devices are omitted. Each panel has at least one row of risers parallel to the seams. The risers contain ells as described above with respect to FIGS. 5 and 6. Additionally, pan distributor 162 has a wall 185 about its periphery, equally spaced wall-ells as in FIG. 5, (not shown in FIG. 9) and 2(R)+1 rows of holes on the bottom surface of each panel, where R is equal to the number of rows of risers on a panel (not shown). The holes surround the risers in a hexagonal pattern. The branch conduits of distributor 128 each have a plurality of bottom holes (not shown) aligned along the seams on the pan deck 171. The seams and branch conduits define points of vertical parallel planes that are substantially perpendicular to the horizontal plane defined by the main conduits 129. The pan distributor 162 of this second embodiment has a center panel 165 extending on either side of the Y-axis of the pan distributor 162. This panel has two rows of risers. To the right and left of this panel, connected by welded seams, are two additional panels 164 and 166, each of which has two rows of risers like panels 64 and 65 of FIG. 5. Finally, pan distributor 162 has two outside panels 163 and 167, making up the fourth and fifth panels, each of which has one row of risers, like panels 63 and 66 of FIG. 5.

As in FIGS. 5, 6, the risers of pan distributor 162 which are across a seam from risers on adjacent panels have ells with openings that face towards each other and, hence, towards the seam. Adjacent risers positioned across the two seams closest to the tower midline are set preferably in a square pitch, while risers positioned across the two seams closest to the tower sidewalls are set preferably in an equilateral triangular pitch. Adjacent holes lying across a seam from a first pair of holes are set in a square pitch, as in FIG. 5. The outer periphery of this pan deck is set on a tray ring, as described above with respect to FIG. 6.

This device works like the device disclosed in the first embodiment.

While two preferred forms of the inventive distribution device have been described and illustrated, it should be apparent that many modifications may be made to each without departing from the spirit and scope of the invention. For example, all dimensions given are exemplary, and can be varied according to the requirements of a given tower 20. As an example of the use of the invention, distribution device 25, described above with reference to FIGS. 1–7, can handle an average of 450 gallons per minute and a maximum flow rate of 542 gallons per minute. The minimum flow rate needed to maintain a liquid level above the horizontal extension of ells 75 and wall-ells 93 is 235 gallons per minute. The size and number of riser, ells, and bottom holes of the pan distributor and the outlets and diameter of pipes of the box-pipe distributor will be determined by the flow rate desired. Moreover, although the invention has been described with reference to the environment of separating liquids and gases, a distribution device according to the invention may also be used to distribute a liquid feed more evenly to a tower or reactor containing catalyst beds or even to other vertical structures where a liquid must be evenly distributed. Accordingly, the disclosed invention is not limited by the foregoing description, but is only limited by the scope of the appended claims.

What is claimed is:

1. A device for uniformly distributing a liquid over a surface of a packed material bed, comprising:
   a housing confining a packed material bed;

a first liquid distributor supported above said packed material bed and comprising at least one elongated main conduit having a bottom, and side walls extending upwardly therefrom, said conduit having holes spaced along its bottom, and at least one pair of branch conduits having first ends, and closed second ends, said first ends being connected to the sidewalls of said at least one main conduit, and being in open communication with said at least one main conduit to receive a liquid therefrom, said branch conduits being substantially perpendicular to said at least one main conduit and having a plurality of bottom holes spaced therealong;

a second liquid distributor located below said first distributor, said second distributor comprising a deck for receiving liquid flowing downwardly through the holes of said first liquid distributor, a sidewall surrounding said deck, and at least two parallel rows of risers supported on said deck, said risers being located horizontally displaced from bottom holes provided in said first liquid distributor, said risers permitting gas to pass upwardly through said deck, said deck having a plurality of holes therein positioned about said risers to permit liquid flow from said deck to said packed material bed;

each of said risers housing an ell having a first extension opening through a wall of an associated riser and a second extension extending downwardly within said riser, said ells causing liquid on said deck to pass below said deck to said packed material bed.

2. The distribution device of claim 1, wherein said first and second distributors and said packed material bed housing form at least part of a cylindrical hydrocarbon processing tower and wherein said first distributor has one centrally-positioned main conduit extending along a first diameter of the tower, and three pairs of branch conduits, including a central pair of branch conduits extending along a second diameter of the tower, and two branch conduit pairs lying on either side of said central pair of branch conduits and being spaced an equal distance therefrom.

3. The distribution device of claim 2, further comprising wall-ells positioned about an outside surface of said deck side wall, wherein horizontal extensions of said wall-ells open into a liquid holding area defined by said deck and said sidewall and wherein vertical extensions of said wall-ells extend downwardly between an inside wall surface of said tower and the outside surface of the deck sidewall.

4. The distribution device of claim 3, having a plurality of panels aligned sequentially edge to edge being connected and defining parallel seams creating said deck, each of said seams lying below an associated pair of branch conduits, wherein said seams and branch conduits define respective vertical planes, said vertical planes being substantially perpendicular to a horizontal plane defined by the branch conduits and main conduit, each panel supporting at least one row of risers which is in parallel with a row of risers on another panel, wherein risers located across a said seam have horizontal extensions of their ells facing said seam.

5. The distribution device of claim 4, wherein two inner panels are sandwiched between two outer panels and said two inner panels each have two rows of parallel risers, wherein adjacent risers on each inner panel are set in a triangular pitch relative to one another, and a pair of adjacent risers, in a row of risers next to a seam of one inner panel, are set in a rectangular pitch relative to a pair of adjacent risers across said seam on another inner panel.

6. The distribution device of claim 5, wherein said each panel of said second distributor has a plurality of circular holes, said holes forming parallel rows, said rows being equal in number to $2(R)+1$, where R equals the number of rows of risers on a panel and wherein at least one row of circular holes on each panel is positioned between a seam and a row of risers and wherein a pair of adjacent holes in a first row, next to a seam, is set in a rectangular pitch relative to a pair of adjacent holes across from said seam.

7. The distribution device of claim 1, wherein said first and second distributors and said packed material bed housing form at least part of a cylindrical hydrocarbon processing tower and wherein said first distributor has first and second elongated main conduits lying to the left and right of a mid line diameter of said tower and in parallel therewith, said first and second main conduits defining a horizontal plane relative to the vertical axis of said tower; and at least one set of three branch conduits connected to said first and second main conduits, wherein a first branch conduit of a said set is positioned between said first and second main conduits and has a first end connected to a side of said first main conduit and a second end connected to a side of said second main conduit defining a bridging conduit, and wherein said remaining two branches of a said set are respectively connected to said first and second main conduits and lie on either side of the bridging branch conduit.

8. The distribution device of claim 7 having four sets of parallel spaced branch conduits.

9. The distribution device of claim 8, wherein said second distributor has five connected panels defining four parallel seams creating said deck and wherein each of said seams lies below an associated set of branch conduits and said seams and said associated sets of branch conduits define respective vertical planes perpendicular to a horizontal plane defined by said first and second main conduits.

10. The distribution device of claim 9, wherein three panels are sandwiched between two outer panels and said three panels each have two rows of parallel risers, wherein adjacent risers in a single panel are set in a triangular pitch relative to one another and a pair of adjacent risers, in a row of risers next to a seam, are set in a rectangular pitch relative to a pair of adjacent risers across said seam.

11. The distribution device of claim 10, wherein said second distributor has a plurality of circular holes, said holes forming parallel rows, said rows being equal in number to $2(R)+1$, where R equals the number of rows of risers on a panel and wherein at least one row of circular holes on each panel is positioned between a seam and a row of risers and wherein a pair of adjacent holes in a first row, next to a seam, is set in a rectangular pitch relative to a pair of adjacent holes across from said seam.

12. A pan for use in a gas liquid separator, said pan comprising:
a deck,
a wall surrounding said deck creating a liquid holding area on said deck; and
a plurality of risers supported by said deck, each of said risers comprising a hollow tube extending upwardly above the deck and having top and bottom open ends, the bottom end being fastened to the deck and in open communication with an underside of the deck; an ell housed and supported within each riser, and having a horizontal extension terminating at a side wall of the riser and in open communication to an outside wall of the riser, said ell further having a vertical extension extending downwardly within said riser; and, said deck further containing a plurality of holes therein surrounding said risers.

13. The pan according to claim 12, further comprising a plurality of wall-ells equally spaced about an outside surface of said wall, a horizontal extension of each wall ell being connected to the wall and opening into the liquid holding area of the pan, and a vertical extension of each wall ell extending downwardly.

14. The pan, according to claim 13, wherein said risers have a hat at their top open end for allowing gases to rise therethrough, but preventing liquid from falling therethrough.

* * * * *